US010240045B2

(12) United States Patent
Rueger et al.

(10) Patent No.: US 10,240,045 B2
(45) Date of Patent: Mar. 26, 2019

(54) NON-METALLIC PIGMENTS HAVING METAL PROPERTIES

(71) Applicant: MERCK PATENT GMBH, Darmstadt (DE)

(72) Inventors: Reinhold Rueger, Roedermark (DE); Bjoern Kleist, Gimbsheim (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/534,716

(22) PCT Filed: Nov. 23, 2015

(86) PCT No.: PCT/EP2015/002352
§ 371 (c)(1),
(2) Date: Jun. 9, 2017

(87) PCT Pub. No.: WO2016/091355
PCT Pub. Date: Jun. 16, 2016

(65) Prior Publication Data
US 2017/0321057 A1     Nov. 9, 2017

(30) Foreign Application Priority Data

Dec. 12, 2014   (DE) .................. 10 2014 018 275

(51) Int. Cl.
*C09C 1/00*    (2006.01)
*C09D 17/00*   (2006.01)
(Continued)

(52) U.S. Cl.
CPC ............. *C09C 1/0021* (2013.01); *B05D 7/24* (2013.01); *C04B 35/62805* (2013.01);
(Continued)

(58) Field of Classification Search
CPC ..... B05D 7/24; C01P 2004/20; C01P 2004/61; C01P 2006/62; C09C 1/0021;
(Continued)

(56) References Cited

U.S. PATENT DOCUMENTS 3,053,683 A     9/1962  Yolles
3,087,827 A *   4/1963  Klenke, Jr. ............ B82Y 30/00
                                                    106/417
(Continued)

FOREIGN PATENT DOCUMENTS

DE    3842330 A1   6/1990
DE    4140296 A1   6/1993
(Continued)

OTHER PUBLICATIONS

A. C. Ferrari and J. Robertson, "Interpretation of Raman Spectra of Disordered and Amorphous Carbon," Physical Review B, vol. 61, No. 20, 2000, pp. 14095-14107.
(Continued)

*Primary Examiner* — Shuangyi Abu Ali
(74) *Attorney, Agent, or Firm* — Millen White Zelano & Branigan

(57) ABSTRACT

The present invention relates to non-metallic interference pigments, in particular laminar interference pigments, which comprise a thin high-refractive layer and an outermost layer that contains crystalline carbon in the form of graphite and/or graphene. The invention also relates to a method for producing such pigments and the use of the thus produced pigments.

12 Claims, 3 Drawing Sheets

(51) Int. Cl.
| | |
|---|---|
| *B05D 7/24* | (2006.01) |
| *C09D 11/037* | (2014.01) |
| *C09D 7/40* | (2018.01) |
| *D21H 19/38* | (2006.01) |
| *D21H 21/30* | (2006.01) |
| *D21H 21/40* | (2006.01) |
| *C04B 35/628* | (2006.01) |
| *C09D 1/00* | (2006.01) |

(52) U.S. Cl.
CPC .. *C04B 35/62821* (2013.01); *C04B 35/62823* (2013.01); *C04B 35/62839* (2013.01); *C04B 35/62884* (2013.01); *C04B 35/62894* (2013.01); *C04B 35/62897* (2013.01); *C09C 1/0015* (2013.01); *C09D 1/00* (2013.01); *C09D 7/40* (2018.01); *C09D 7/70* (2018.01); *C09D 11/037* (2013.01); *C09D 17/008* (2013.01); *D21H 19/38* (2013.01); *D21H 21/30* (2013.01); *D21H 21/40* (2013.01); *C01P 2004/20* (2013.01); *C01P 2004/61* (2013.01); *C01P 2006/40* (2013.01); *C01P 2006/62* (2013.01); *C04B 2235/3217* (2013.01); *C04B 2235/3232* (2013.01); *C04B 2235/349* (2013.01); *C04B 2235/3418* (2013.01); *C04B 2235/3427* (2013.01); *C04B 2235/386* (2013.01); *C04B 2235/5292* (2013.01); *C04B 2235/5436* (2013.01); *C09C 2200/102* (2013.01); *C09C 2200/1004* (2013.01); *C09C 2200/1037* (2013.01); *C09C 2200/1087* (2013.01); *C09C 2200/301* (2013.01); *C09C 2200/302* (2013.01); *C09C 2200/304* (2013.01); *C09C 2200/306* (2013.01); *C09C 2200/307* (2013.01); *C09C 2200/308* (2013.01); *C09C 2200/401* (2013.01); *C09C 2220/20* (2013.01)

(58) Field of Classification Search
CPC ...... C09C 2200/102; C09C 2200/1037; C09C 2200/302; C09C 2200/401; C09D 11/037; C09D 17/008; C09D 7/1291; C09D 7/70
See application file for complete search history.

(56) References Cited

U.S. PATENT DOCUMENTS

| | | | |
|---|---|---|---|
| 3,949,139 | A | 4/1976 | Dunning et al. |
| 4,321,087 | A | 3/1982 | Cueli |
| 4,568,609 | A | 2/1986 | Sato |
| 5,320,781 | A | 6/1994 | Stahlecker |
| 5,322,561 | A | 6/1994 | Prengel |
| 5,472,640 | A | 12/1995 | Bruckner |
| 5,628,932 | A | 5/1997 | Linton |
| 6,280,520 | B1 | 8/2001 | Andes |
| 6,686,042 | B1 | 2/2004 | LeGallee |
| 6,997,982 | B2 | 2/2006 | Pfaff |
| 2004/0165272 | A1 | 8/2004 | Phillips |

FOREIGN PATENT DOCUMENTS

| | | |
|---|---|---|
| DE | 4237990 A1 | 5/1994 |
| DE | 10153197 A1 | 5/2003 |
| EP | 139557 A1 | 5/1985 |
| EP | 743654 A2 | 11/1996 |
| EP | 359569 B1 | 3/1997 |
| EP | 950693 A1 | 10/1999 |

OTHER PUBLICATIONS

International Search Report for PCT/EP2015/2352 dated Mar. 14, 2016.
Fitzer et al.; International Union of Pure and Applied Chemistry Recommended terminology for the description of carbon as a solid (IUPAC Recommendations 1995) Pure and Applied Chemistry vol. 67, Issue 3 Published Online: Jan. 1, 2009.

* cited by examiner

NON-METALLIC PIGMENTS HAVING METAL PROPERTIES

The present invention relates to non-metallic interference pigments having metallic properties, in particular flake-form interference pigments, which have a thin high-refractive-index layer and an outermost layer which comprises crystalline carbon in the form of graphite and/or graphene on a support, to a process for the preparation of such pigments, and to the use of the pigments prepared in this way.

Metal-effect pigments have been employed for many years in coatings in order to produce metallic effects, for example in printing inks or in metallic paints for automobiles. Classical metal-effect pigments consist of flake-form metal particles whose optical effect is based on the directed reflection of incident light at the ideally flat and planar surface of the metal particles, which are aligned parallel to the surface in the respective application medium.

Essential features for the metal effect of a coating are the high metallic lustre, the lightness flop, the hiding power and the distinctness of image (DOI). The lightness flop represents the capacity of the coating to leave the impression of different lightness at different illumination and/or viewing angles with an unchanged colour of the coating, while the DOI describes the imaging sharpness of a reflection in the coating. With the aid of these parameters, the quality of a metal-effect pigment is also assessed.

Important parameters for the characterisation of metal-effect pigments are the flake shape, the form factor (ratio of average particle diameter to average particle thickness), the particle size and the quality of the surface smoothness of the flakes.

The types of metal-effect pigment worldwide that are most frequently employed consist of aluminium, in addition also copper and copper/zinc pigments or also zinc pigments. Shape, thickness, size and surface quality of the metal pigments are determined by the preparation process.

Relatively high-quality aluminium pigments, which are known as silver dollars, are prepared from aluminium shot by means of a mechanical process and have a round flake shape and a comparatively smooth surface. Such pigments are offered, for example, under the name Stapa® Metallux 2000 by Eckart GmbH.

The publications U.S. Pat. Nos. 3,949,139 and 4,321,087 disclose particularly thin aluminium pigments having a thickness of less than 100 nm. These metal pigments are prepared by a complex PVD process. Such pigments facilitate higher-quality coatings having high lustre, hiding power and high distinctness of image compared with conventional aluminium pigments. Pigments of this type are available, for example, under the name Metallure® from Eckart GmbH. However, their use requires very specific applicational knowhow in order to achieve reproducible effects, since the pigments have low mechanical stability and may only be subjected to low shear forces during processing. Their use in water-based application systems is also problematic owing to the large reactive surface. For certain applications, for example powder coatings, they are in addition not suitable at all.

In general, the use of metal-effect pigments, in particular of aluminium pigments, requires particularly high attention to fire and explosion protection owing to their combustibility. Owing to the high reaction capacity of the non-noble metal, stabilisation of coating compositions comprising aluminium pigments before and after processing is also difficult.

Many attempts have therefore been made in the past to provide effect pigments which do not consist of metals, but instead have layers of metal oxides and/or metals on suitable support materials, with which metallic lustre can be produced. However, the corresponding pigments, in particular if they do not contain metal layers, often have only a low hiding power with good lustre values, since they generally consist of transparent support particles and/or transparent layers applied to the support particles.

U.S. Pat. No. 3,053,683 discloses glass pigments which have a coating comprising chromium, aluminium or nickel on their surface. DE 101 53 197 describes pigments having metallic lustre which have a metal layer surrounding the substrate on the surface of flake-form, non-metallic substrates which have a thickness of less than 200 nm. However, pigments which have metal layers on their surface frequently have to be stabilised with subsequent, very thin oxide layers or spontaneous oxidation of the metals occurs in the application medium or during storage, causing a weakening of the metallic properties of the pigments.

In particular in the case of paint layers or prints, antistatic properties, screening behaviour against electromagnetic radiation or electrical conductivity are increasingly being demanded in addition to the desired decorative properties.

It is still usual to employ carbon black or graphite as conductive filler in the respective application media. However, the use of carbon black or graphite results in a dark coloration of the materials to which it has been added, which is often perceived as disadvantageous.

Electrically conductive pigments based on transparent substrates, especially based on thin mica flakes, have therefore already been known and available for some time. These pigments generally have at least one conductive coating comprising a doped tin oxide on the mica substrate. Antimony-doped tin dioxide is frequently employed. Pigments of this type are commercially available, for example, as Minatec® 31 CM or Minatec® 51 CM from Merck KGaA, Germany. They are described, inter alia, in the patent specifications DE 38 42 330, DE 42 37 990, EP 0 139 557, EP 0 359 569 and EP 0 743 654.

Such pigments have high transparency and a pale inherent colour and therefore offer many optical advantages over the use of carbon black or graphite, but usually have an uncoloured or pale-grey inherent coloration. In order to achieve metal-coloured and/or opaque conductive application media, the conductive pigments must be employed in combination with other colorants. Such combinations are technically possible, but often result in an extremely high pigment weight concentration in the application media.

In particular, the use of colorants reduces or interrupts the formation of conductive pathways in the application medium, with the result that a considerable increase in the electrical resistance occurs there. This increase cannot be compensated in all cases by an equally increased concentration of conductive pigments, since the application systems have technically necessitated limits of the pigment loading, the exceeding of which results in processing problems or problems in achieving the desired technical results.

Pigments having metal layers on the surface which consist of non-noble metals which themselves have very good electrical conductivity often only effect significantly weakened electrical conductivity in the application medium, since, as already described above, they either subsequently oxidise spontaneously or have to be chemically stabilised via metal oxide layers in the post-coating. If surface coatings having a metallic appearance are required to have electrical conductivity, recourse is therefore frequently made to silver-coated pigments, but these are very expensive.

There is therefore a need for electrically conductive pigments with which electrically conductive application media having high hiding power which have a metallic appearance and are preferably silver or gold coloured can be obtained without the need to employ further colorants.

Electrically conductive effect pigments are known per se, but they often either have inadequate electrical conductivity or an inadequate hiding power or a dark colour which is not optically comparable with metal-effect pigments.

In order to obtain electrically conductive effect pigments, flake-form pigments are, for example according to DE 41 40 296 A1, coated with a metal oxide layer permeated with carbon black particles which is doped with additional metal oxide particles in order to establish or increase the electrical conductivity of the pigment. Whereas the metal oxide layer is generally a titanium dioxide layer, $SiO_2$ or $Al_2O_3$ are additionally included therein in addition to carbon black particles, which results in improved conductivity. However, the pigments only achieve a specific powder resistance of $2\times10^6$ ohm*cm in the best case and a black to pale grey or silver-grey colour, but do not have a metallic appearance with a high hiding power.

The prior-art pigments described above have either good optical metaleffect properties with undetermined electrical properties or satisfactory electrically conductive properties with a dull coloration with a non-metallic appearance. For the preparation of application media having reliable screening or antistatic electrical properties, however, specific powder resistances of the electrically conductive pigments employed of at most $1\times10^6$ ohm*cm are necessary in order to guarantee the requisite electrical properties of the end products. In addition, there is still a need for effect pigments having an attractive metallic appearance which have the requisite high electrical conductivity.

The object of the present invention is to provide effect pigments having a metallic appearance and very high hiding power which have a specific powder resistance of at most $1\times10^6$ ohm*cm or less, are chemically stable and are safe from a health point of view and can easily be processed in application media such as surface coatings, printing inks and plastics.

In addition, it is also an object of the present invention to provide a simple process for the preparation of the pigments described above.

A further object of the present invention consists in indicating the use of pigments of this type.

The object of the present invention is achieved by non-metallic interference pigments based on a flake-form support, where the pigments have a particle size having a volume-weighted $d_{90}$ value of <25 μm and the support has a coating comprising one or more successive layers of a colourless material having a refractive index n of n≥1.8 with a geometrical overall layer thickness of at most 70 nm, and where the pigments have an outermost layer which consists of at least 95% by weight, based on the weight of this layer, of carbon and comprises crystalline carbon in the form of graphite and/or graphene.

The object of the invention is likewise achieved by a process for the preparation of the said conductive pigments, in which flake-form support particles which have been coated with one or more successive layers of a colourless material having a refractive index n of n≥1.8 with a geometrical overall layer thickness of at most 70 nm and have a particle size having a volume-weighted $d_{90}$ value of <25 μm are coated with an outermost layer which consists of at least 95% by weight, based on the weight of this layer, of carbon and comprises crystalline carbon in the form of graphite and/or graphene, in a reactor in a stream of carrier gas with feed of a gaseous, carbon-containing compound by pyrolytic decomposition of the carbon-containing compound.

The object is furthermore achieved by the use of the electrically conductive, non-metallic interference pigments described above in paints, coatings, printing inks, coating compositions, security applications, plastics, ceramic materials, glasses, paper, films, in heat protection, in floorcoverings, for laser marking, in dry preparations or pigment preparations.

The present invention relates to a non-metallic, electrically conductive, flake-form interference pigment having a metallic appearance which is based on a non-metallic flake-form support and has been coated with one or more non-metallic high-refractive-index layers having a low overall layer thickness and an outermost layer, where the outermost layer of the pigment consists of at least 95% by weight, based on the weight of this layer, of carbon and comprises crystalline carbon in the form of graphite and/or graphene.

The outermost layer, which consists of at least 95% by weight, based on the weight of this layer, of carbon and comprises crystalline carbon in the form of graphite and/or graphene, is called "outermost, crystalline carbon-containing layer" below, unless indicated otherwise.

Preference is given to an embodiment of the present invention in which the outermost, crystalline carbon-containing layer consists of at least 98% by weight of carbon.

This outermost, crystalline carbon-containing layer surrounds the support flake or the layer(s) located beneath this outermost layer on the support flake and is preferably compact and formed as a continuous layer. It has a geometrical thickness in the range 0.5-5 nm, in particular 1-3 nm. In the lower layer-thickness range from 0.5 to 3 nm, this corresponds to a single graphene layer or graphite which is composed of very few (<10) carbon layers.

Compared with industrial black, which is also known as carbon black, both graphene and also graphite crystals have significantly higher ordering. The term carbon black is applied to a finely divided carbon which is produced industrially by thermal decomposition or by incomplete combustion of hydrocarbons and which consists of spherical primary particles which have grown together to form aggregates having a particle size of less than 1000 nm. They contain a small amount of foreign constituents.

Whereas graphene represents a single layer in graphite structure whose nature is described analogously to a polycyclic aromatic hydrocarbon of quasi-infinite size and in which the carbon atoms are in a honeycomb-like arrangement in the layer, graphite represents an allotropic form of the element carbon which consists of layers of hexagonally arranged carbon atoms in a ring system condensed in a planar arrangement. The layers are stacked parallel to one another in crystallographically three-dimensional long-range order. There are two allotropic forms with a different stack arrangement, hexagonal and rhombohedral.

Types of carbon which contain the element carbon in the allotropic form of graphite, irrespective of structure defects present (volume proportion and homogeneity of the crystalline domains), i.e. in which a three-dimensional crystalline long-range order in the material can be demonstrated by diffraction methods, are also known as graphitic carbon.

According to this nomenclature (see W. Klose et. al., "*Terminologie zur Beschreibung von Kohlenstoff als Feststoff*"[Terminology for the Description of Carbon as a Solid], Deutsche Keramische Gesellschaft, Specialist Committee Report No. 33, 3rd report of the Carbon Working Group, 2009), it is justified also to refer to the crystalline carbon-containing outermost layer of the interference pigments according to the invention as "layer of graphitic carbon".

The said structural differences also explain the at least partly different properties of graphene and graphite crystals compared with conventional industrial blacks. Thus, the former have, for example, significantly greater electrical conductivity than standard particulate industrial black. The electrical conductance in graphite crystals is different parallel and perpendicular to the individual carbon planes.

Surprisingly, the inventors of the present invention have now succeeded in preparing non-metallic effect pigments having a metallic appearance in which the presence of graphene or graphite crystals in an outermost layer essentially consisting of carbon (layer of graphitic carbon) on a flake-form support material can be demonstrated. This also explains the high electrical conductivity of the pigments obtained, which can be adjusted specifically via the geometrical layer thickness of the outermost, crystalline carbon-containing layer on the support particles. The electrical conductivity of the pigments obtained increases significantly even at a very small geometrical layer thickness of only a few nanometres, which can be determined via a significantly reduced specific powder resistance of the pigments obtained. The carbon layer is characterised by means of Raman spectroscopy. The evaluation is carried out in accordance with "Interpretation of Raman spectra of disordered and amorphous carbon, A. C. Ferrari and J. Robertson, University Cambridge, 24.11.1999". A carbon layer is essentially described with two peaks which occur in the corresponding Raman spectra owing to $sp^2$-hybridised carbon atoms. The G peak (graphite) at a wavenumber of 1580 to 1600 $cm^{-1}$ results from stretch vibrations of $sp^2$hybridised carbon atoms in rings and chains. The D peak (disorder), by contrast, is in a wavenumber range from 1360 to 1400 $cm^{-1}$ and results from centre-symmetrical stretch vibrations. In pure crystalline graphite, this vibration is forbidden and therefore only occurs in subordinate systems. If the wavenumber of the peaks obtained and the intensity ratio I(D)/I(G) of the material to be characterised is determined from the Raman spectrum obtained, a distinction can be made in accordance with the diagram according to FIG. 1 between graphite, NC graphite (nanocrystalline graphite), a-C (amorphous carbon) and ta-C (tetrahedal amorphous carbon). In this way, the presence of nanocrystalline graphite in the pigments according to the invention is confirmed.

Pigments or support materials are referred to as flake-form if their outer shape corresponds to a flat structure which, with its upper side and lower side, has two approximately parallel surfaces whose length and width dimension represents the greatest dimension of the pigment or support material. The separation between the said surfaces, which represents the thickness of the flake, has, by contrast, a small dimension.

The length and width dimension of the pigments, which also represents the value which is usually referred to as the particle size of the interference pigments, here is between 1 and 35 µm with a volume-weighted $d_{90}$ value of <25 µm. The volume-weighted $d_{50}$ value here is <15 µm. The volume-weighted $d_{90}$ or $d_{50}$ values in each case indicate that 90 or 50 per cent by volume respectively of the pigments of a pigment heap have a particle size which is below the said value.

The volume-weighted $d_{90}$ value is preferably less than 15 µm and the volume-weighted $d_{50}$ value is preferably less than 10 µm.

The particle size of the non-metallic interference pigments according to the invention is absolutely crucial here since a small particle size, together with a very high fines content, is the determining factor for the very high hiding power of the pigments in the respective application media, whereas the individual pigment particles as such are semi-transparent, i.e. merely gave rise to expectations of a moderate hiding power in the application.

The particle size and particle size distribution can be determined by various methods which are usual in the art. However, use is preferably made in accordance with the invention of the laser diffraction method in a standard process by means of a Malvern Mastersizer 2000, APA200 (product of Malvern Instruments Ltd., UK). This process has the advantage that particle size and particle size distribution can be determined simultaneously under standard conditions.

The particle size and the thickness of individual particles can in addition be determined with the aid of SEM (scanning electron microscope) images. In these, particle size and geometrical particle thickness can be determined by direct measurement. In order to determine average values, at least 1000 particles are evaluated individually and the results are averaged.

The thickness of the interference pigments is between 0.1 and 0.5 µm, in particular between 0.2 and 0.4 µm.

The interference pigments according to the invention have a form factor (ratio of length or width to thickness) in the range from 20:1 to 200:1, preferably in the range from 40:1 to 100:1.

A pigment is regarded as electrically conductive in the sense of the present invention if it has a specific powder resistance in the range up to 1 megaohm*cm ($1 \times 10^6$ ohm*cm). The interference pigments according to the invention preferably have a specific powder resistance in the range up to $1 \times 10^4$ ohm*cm, in particular in the range from 10 to 1000 ohm*cm and particularly preferably in the range from 10 to less than 100 ohm*cm. The values indicated here relate to field strengths of up to 10 V/mm, where the field strength applies to the measurement voltage applied.

The specific powder resistance is measured here by compressing an amount of in each case 0.5 g of pigment in a Plexiglas tube having a diameter of 2 cm against a metal electrode using a metal ram with the aid of a 10 kg weight. The electrical resistance R of the pigments compressed in this way is measured. The layer thickness L of the compressed pigment gives the specific resistance p of the pigment powder in accordance with the following relationship:

$$\rho = R * \pi * (d/2)^2 / L \text{ (ohm*cm)}.$$

Interference pigments having a metallic appearance are taken to mean effect pigments which, based on at least one flake-form support material and one or more thin layers located thereon, reflect light in a directed manner in an application medium in which the pigments are aligned in a planar manner by reflection at interfaces and by means of interference effects over a broad wavelength region of the visible spectrum of sunlight in such a way that very high light reflection in total is perceptible to the observer with the naked eye. This non-selective, directed light reflection which is augmented by interference effects is perceived by the observer as a high lightness value, the perceivable colour is restricted here to silver- or gold-coloured.

A silver or golden interference colour with high lustre and high lightness is therefore visible to the observer in the application medium if the application medium is located on a white or black background. The respective background is completely covered by the pigments in the application medium here, and the coating itself has no differences depending on the colour of the respective background.

Only a different lightness behaviour in the application medium is perceptible at different illumination and/or viewing angles (lightness flop). The interference colour of the pigments according to the invention is essentially set via the material and the thickness of the pigment support and of the high-refractive-index layer or of the high-refractive-index layers on the support.

In accordance with the invention, the flake-form support is a transparent, colourless support, for example natural or synthetic mica flakes, kaolin, sericite or talc flakes, BiOCl flakes, $TiO_2$ flakes, glass flakes, borosilicate flakes, boron nitride flakes, $SiO_2$ flakes, $Al_2O_3$ flakes or mixtures of two or more thereof. Particular preference is given to natural or synthetic mica flakes of any type, other phyllosilicates, such as talc, kaolin or sericite, flake-form $SiO_2$, flake-form $Al_2O_3$, flake-form $TiO_2$ and/or glass flakes. The particle size of the support flakes is in the same range as the particle sizes indicated above for the interference pigments according to the invention, namely in the range between 1 and 35 μm with the restrictions given above regarding the $d_{90}$ and $d_{50}$ values. The thickness of the support flakes is between 0.1 and 0.45 μm, preferably between 0.2 and 0.4 μm.

In accordance with the invention, one or more directly successive layers of a colourless material having a refractive index n in the range n≥1.8, are present between the flake-form support and the outermost, crystalline carbon-containing layer. This layer or these layers have a geometrical overall thickness of at most 70 nm, preferably in the range from 40 to 70 nm, in particular in the range from 50 to less than 70 nm.

Materials having a refractive index in the range n≥1.8 are referred to as high-refractive-index.

High-refractive-index materials of this type which are present in the pigments in accordance with the present invention are preferably colourless metal oxides and/or metal oxide hydrates, namely titanium dioxide, titanium dioxide hydrate, zirconium dioxide, zirconium dioxide hydrate, tin oxide, tin oxide hydrate, zinc oxide, zinc oxide hydrate, and/or mixed phases thereof. They may be present in one or also in a plurality of layers between the flake-form support and the outermost, crystalline carbon-containing layer. If a plurality of layers are present, they are arranged directly on one another.

The layer(s) of high-refractive-index materials may also have been applied to a layer of low-refractive-index materials, for example of metal oxides and/or metal oxide hydrates, such as silicon dioxide, silicon dioxide hydrate, aluminium oxide, aluminium oxide hydrate and/or of mixed phases thereof, or of $MgF_2$, and/or may be surrounded by such a layer.

However, preference is given to the embodiment of the present invention in which the layer or layers of a colourless material having a refractive index n in the range n≥1.8 is arranged or are arranged between the support and the crystalline carbon-containing layer, and the pigments have no further layers.

The layer or layers having a refractive index n in the range n≥1.8 particularly preferably consists of titanium dioxide and/or titanium dioxide hydrate and is present in a stoichiometric composition, i.e. not in the reduced state.

Particular preference is given in accordance with the invention to nonmetallic, electrically conductive pigments in which a layer of titanium dioxide (anatase or rutile modification) and/or titanium dioxide hydrate ($TiO_2$ layer below) is located between a flake-form support and the outermost, crystalline carbon-containing layer, where the geometrical layer thickness of the $TiO_2$ layer is less than or equal to 70 nm. Particular preference is given to non-metallic, electrically conductive interference pigments in which a layer of titanium dioxide (anatase or rutile modification) and/or titanium dioxide hydrate is located on a flake-form support comprising natural or synthetic mica, $SiO_2$ flakes, $TiO_2$ flakes, $Al_2O_3$ flakes or glass flakes, followed by an outermost, crystalline carbon-containing layer. In particular, the flake-form support materials in this layer structure are preferably natural or synthetic mica, $SiO_2$ flakes and $Al_2O_3$ flakes. The limit for the geometrical layer thickness of the $TiO_2$ layer of at most 70 nm, preferably from 40 to 70 nm, as already described above, also applies here.

The non-metallic, electrically conductive interference pigments according to the invention are semitransparent as individual particles, i.e. in the case of planar alignment with the light source, the individual particles not only transmit or reflect part of the incident visible light in the application medium, but also absorb a certain proportion of the incident light in the visible wavelength region. This can essentially be ascribed to the absorption capacity of the outermost, crystalline carbon-containing layer since no further absorbent materials are present in the layer system of the interference pigment. It has surprisingly been found here that the absorption capacity of the electrically conductive interference pigments according to the invention correlates with the degree of their electrical conductivity. Accordingly, the electrical conductance of the pigments according to the invention increases continuously with increasing layer thickness of the outermost, crystalline carbon-containing layer.

In the case of a geometrical layer thickness of the outermost, crystalline carbon-containing layer in the range from 1 to 5 nm, by contrast, the interference colour generated by the support and the high-refractive-index layer(s) located thereon and the high lustre of the pigment hardly changes at all. However, the ΔL value and thus the degree of the hiding power that can be achieved with the pigments according to the invention in the application medium changes with increasing layer thickness of the outermost, crystalline carbon-containing layer.

The ΔL value is a measure of the transparency of interference pigments. If it is particularly high, the interference pigments have high transparency, but no significant hiding power, whereas a very low ΔL value is an indication of interference pigments having high hiding power.

Whether interference pigments are thus rather more transparent or rather more opaque can be determined via lightness values L* of coatings which comprise the interference pigments on black/white coating test charts. The measurements are carried out in the CIEL*a*b* colour space by means of a suitable measuring instrument, for example using an ETA FX11 colorimeter (spectrometer from STEAG-ETA Optic GmbH, Inc.) The measurements are carried out at the mass tone angle 45°/90° (illumination angle 45°, measurement angle)90°, in each case over the coated black and white coating test chart. The L* values determined in each case are inserted into the following equation:

$$\Delta L = (L^*_{45/90/white} - L^*_{45/90/black})$$

(determination of the hiding power HP by the Hofmeister method (Colorimetric evaluation of pearlescent pigments, "Mondial Coleur 85" Congress, Monte Carlo, 1985, in accordance with the equation $HP=100/(L^*_{45/90/white}-L^*_{45/90/black})$).

(For the measurements in accordance with the present invention, in each case a pigment dispersion having a proportion by weight of 1.65% of pigment in LC acrylic lacquer (Merck Article No. 270046) is prepared without bubbles and applied to a conventional black/white chart using a 500 µm bar applicator and dried. The pigment is present in the dried layer in a concentration of 13 per cent by weight (PWC: 13%). The L* values are measured using an ETA FX11 colorimeter from STEGA ETA-Optic GmbH, Inc., at an illumination angle of 45° and a measurement angle of 90°.)

The non-metallic, electrically conductive interference pigments according to the invention have ΔL values in the range of less than 10, preferably ≥5, which are determined by the method described above. In this xL range, the interference pigments according to the invention have high electrical conductivity, where the specific powder resistance of the pigments is less than $1 \times 10^6$ ohm*cm, preferably less than $1 \times 10^4$ ohm*cm, and in particular in the range from 10 to 1000 ohm*cm, particularly preferably in the range from 10 to 100 ohm*cm. This high electrical conductivity is comparable to or even exceeds the electrical conductivity of (conductive) metals or pigments having (conductive) metal layers and can be achieved with geometrical layer thicknesses of the outer, crystalline carbon-containing layer on the pigments which is merely in the range from 1 to 5 nm. The proportion by weight of this outermost, crystalline carbon-containing layer here is 0.5 to 5% by weight, in particular 1 to 3% by weight, based on the weight of the interference pigment according to the invention.

The pigments according to the invention, whose ΔL values are in the range less than 10, in particular from 1 to 5, have high metallic lustre as well as an intense silver or golden interference colour and have a very good hiding power, meaning that coatings comprising binders, solvents and the pigments according to the invention applied to conventional black/white coating test charts and dried have, both on the white coating test chart and on the black coating test chart, a uniform, identically coloured, metallic appearance of high aesthetic value which simulates a coating with metal-effect pigments. The outermost, crystalline carbon-containing layer of the pigments, in spite of the low layer thickness, is stable and abrasion-resistant and compact, so that quality losses do not have to be expected, even on mechanical stressing of the pigments.

Both in the optical appearance and also in the electrical conductivity, coatings which comprise the non-metallic effect pigments according to the invention as the only pigments give the impression of sole pigmentation with electrically conductive metal-effect pigments. The pigments according to the invention can therefore be employed in all applications which require a metallic appearance of the application medium and high electrical conductivity thereof without the disadvantages in the preparation, processing and use of metal-effect pigments having to be accepted.

The present invention also relates to a process for the preparation of the said non-metallic, electrically conductive interference pigments in which flake-form support particles which have been coated with one or more successive layers of a colourless material having a refractive index n of n≥1.8 with a geometrical overall layer thickness of at most 70 nm and have a particle size having a volume-weighted $d_{90}$ value of <25 µm are coated with an outermost layer which consists of at least 95% by weight, based on the weight of this layer, of carbon and comprises crystalline carbon in the form of graphite and/or graphene, in a reactor in a stream of carrier gas with feed of a gaseous, carbon-containing compound by pyrolytic decomposition of the carbon-containing compound.

Particulate starting materials employed for the process according to the invention are the coated flake-form support particles described above. All support and layer materials which have already been described above are possible here.

The support materials coated with one or more high-refractive-index layers are commercially available. Since these are in most cases and preferably conventional interference pigments, such pigments can be procured already in the corresponding size range from most manufacturers. The effect pigments offered under the names Iriodin® 111, Iriodin® 119 or Xirallic® Micro Silver by Merck KGaA, Germany, for example, have proven highly suitable. Otherwise, commercially available interference pigments can and must also be subjected to grinding and/or classification processes before being introduced into the process according to the invention, since both the particle size and also the fines content are crucial for the product properties of the pigments according to the invention.

However, the said support particles may also, before the coating with the outermost, crystalline carbon-containing layer, be coated with one or more high-refractive-index layers by means of the conventional coating methods which are generally customary for effect pigments. Both wet-chemical and also CVD, PVD or sol/gel processes, all of which are usually used in the coating of effect pigments, can be employed here. Owing to the ease with which the coating process can be carried out and for cost reasons, however, the use of wet-chemical processes with inorganic starting materials is preferred. These are explained briefly below. All other processes mentioned are likewise familiar to the person skilled in the art and do not require further explanation.

The preparation of interference pigments which are coated at least with a layer of $TiO_2$ on a support is carried out by the conventional processes for the preparation of interference pigments, preferably by means of wet-chemical processes. These are described, for example, in the specifications DE 14 67 468, DE 19 59 998, DE 20 09 566, DE 22 14 545, DE 22 15 191, DE 22 44 298, DE 23 13 331, DE 25 22 572, DE 31 37 808, DE 31 37 809, DE 31 51 355, DE 32 11 602 and DE 32 35 017.

To this end, the substrate flakes are suspended in water. A $TiO_2$ layer is preferably applied here analogously to the process described in U.S. Pat. No. 3,553,001. In this process, an aqueous titanium salt solution is slowly added to a suspension of the pigment to be coated, the suspension is heated to 50 to 100° C., and the pH is kept virtually constant in the range from 0.5 to 5.0 by simultaneous addition of a base, for example an aqueous ammonium hydroxide solution or an aqueous alkali-metal hydroxide solution. When the desired $TiO_2$ layer thickness on the pigment flakes has been reached, the addition of the titanium salt solution and the base is terminated. Since the titanium salt solution is added so slowly that quasi-complete deposition of the hydrolysis product on the pigment flakes takes place, there are virtually no secondary precipitations. The process is known as the titration process.

If layers of low-refractive-index materials are also to be applied, which is, however, not preferred, the application of an $SiO_2$ layer is explained here by way of example:

For the application of an SiO$_2$ layer, a sodium or potassium water-glass solution is generally employed. The precipitation of a silicon dioxide or silicon dioxide hydrate layer is carried out at a pH in the range from 6 to 10, preferably from 7 to 9.

The coated support particles are worked up in the usual manner for interference pigments, generally by washing, drying and preferably also calcination of the coated support particles. If necessary, this may be followed by grinding and/or classification steps.

The flake-form support particles which have been coated in advance are then introduced into the reactor.

Suitable reactors in which the process according to the invention can be carried out are both rotary-tube furnaces and also fluidised-bed reactors, where the latter are preferentially employed. The coating process is carried out in a stream of carrier gas. The carrier gas employed is an inert gas, synthetic air or forming gas. Examples of inert gases which may be mentioned are nitrogen and argon, where nitrogen is preferentially employed.

A gaseous, carbon-containing compound is fed to the carrier gas. This preferably consists of volatile hydrocarbons, which, besides carbon, only contain hydrogen and possibly also oxygen. Examples which may be mentioned are acetone, ethyne or 2-methyl-3-butyn-2-ol. Acetone and 2-methyl-3-butyn-2-ol are preferentially employed, where acetone is particularly preferred. However, the carrier gas may also itself consist of the gaseous, carbon-containing compound, which in this case takes on both the function of the carrier gas and also that of the gaseous, carbon-containing compound.

It is particularly important for the success of the process according to the invention that the flake-form support particles are in motion and are kept in motion in the reactor during the reaction. To this end, the flake-form support particles must be adequately fluidised during the reaction. If the fluidisation of the support particles by the stream of carrier gas and the gaseous, carbon-containing compound should not be sufficient, suitable fluidisation apparatuses, such as vibration and/or shaking devices, should therefore be employed.

After adequate fluidisation of the flake-form support particles in the reactor, the reaction temperature is set. The temperature during the coating process is set in the reactor so that the carbon-containing, gaseous compound is pyrolytically decomposed. In accordance with the invention, it is in the range from 400° C. to 900° C., preferably in the range from 500° C. to 700° C., and is set depending on the type of carbon-containing compound to be decomposed.

The gaseous, carbon-containing compound can optionally be fed to the reactor before or after the reaction temperature has been reached or during establishment of the reaction temperature. Feed before the requisite reaction temperature has been reached is preferred. It is particularly preferred if the gaseous, carbon-containing compound and the carrier gas are already in the form of a mixture in a suitable ratio before feeding into the reactor and are fed jointly to the reactor. The amount of carbon-containing compound fed in can be controlled here via the temperature and/or the vapour pressure of the corresponding gaseous compound. After completion of the pyrolytic reaction and after the desired layer thickness of the outermost layer has been reached, the carbon source is turned off.

The reaction time is about 5 to 200 minutes, preferably 10 to 150 minutes. Within this reaction time, a compact, continuous outermost layer which consists of at least 95% by weight, preferably at least 98% by weight, based on the weight of this layer, of carbon and comprises crystalline carbon in the form of graphene and/or graphite is applied to the pre-coated flake-form support particles employed. The layer thickness of this layer increases constantly during the reaction and can be controlled through the selected duration of the reaction. The electrical conductivity and the hiding power of the resultant pigments increases with the layer thickness of the outermost layer.

Since both the lustre and also the metal-like interference colour of the resultant pigments are also adversely affected in the case of layer thicknesses of the outermost layer of greater than 5 nm, the geometrical layer thickness of the outermost, crystalline carbon-containing layer is set to values in the range from only 0.5 to 5 nm, preferably to 1 to 3 nm, in the process according to the invention.

After the thermal treatment, the interference pigments obtained are cooled and classified. If necessary, one or more grinding processes can also be carried out before or after the classification for further separation of the pigments obtained.

The process according to the invention can be carried out both as a batch process and also as a continuous process. In addition, it enables a high throughput of pigments in a short time span and is therefore also attractive from an economic point of view.

The present invention also relates to the use of the pigments according to the invention described above in paints, coatings, printing inks, coating compositions, security applications, plastics, ceramic materials, glasses, paper, films, in heat protection, in floorcoverings, for laser marking, in dry preparations and pigment preparations.

Due to their metallic appearance with high lustre and silver or golden interference colour and the extraordinarily high hiding power, the pigments according to the invention are highly suitable, merely owing to their colour properties, for use for the pigmentation of application media of the abovementioned type. They are employed here in the same way as conventional interference pigments. However, it is particularly advantageous that, besides the attractive optical properties, they also have high electrical conductivity, which makes them particularly suitable for use in technical applications that require electrically conductive coatings. Thus, they are particularly suitable for the production of electrically conductive coatings having a metallic appearance on various substrates, which can be produced by means of painting or printing processes or other conventional coating processes. Since the pigments according to the invention still have good electrical conductivity even in extremely thin coatings, very thin coatings, in particular prints, having a metallic appearance, high lustre and very good hiding power which, in addition, have considerable electrical conductivity can be obtained therewith. It is therefore possible to find potential uses of conductive pigments that were not available with the prior-art pigments available to date, for example metal-coloured surface coating and printed layers having resistances in the antistatic to electrically dissipative range, i.e. in the range from $10^9$ ohm to $10^4$ ohm, measured as specific surface resistance of the corresponding coating or printed layer.

With the non-metallic, electrically conductive pigments according to the invention, the print material can be provided with fully opaque full-tone areas at a high line count and high resolution, for example at 60 l/cm, for example in mass printing processes, such as gravure printing or flexographic printing, which only give rise to very low print layer thicknesses of a few microns thick. Area coverage of this type would not be achievable with coarser pigment particles, even with the same pigment layer structure. This makes it possible, using the processes usually employed for packaging printing on pale and dark print materials, to apply opaque, electrically conductive coatings having a metallic appearance to papers, cardboards or films. Packaging materials of this type have a high aesthetic value and at the same time have electrically dissipating properties, which makes them appear suitable as materials of choice for the packaging of electronic products, which have to be protected against electromagnetic discharge. Coatings of this type can of course also be applied as primer or undercoat layers to a very wide variety of substrates, such as, for example, to plastic parts of automobile bodies, and subsequently overcoated or overprinted with further layers or motifs.

The finely divided nature of the interference pigments according to the invention makes very low layer thicknesses of the respective application medium, for example in the range 2-20 µm, possible without qualitative reductions in the hiding power or electrical conductivity of the coating having to be made.

The pigments according to the invention are also highly suitable in security applications, in particular in security printing. They can be employed there for the production of hidden security features which are invisible to the naked eye, but can be read out using corresponding detectors. Thus, with the aid of the pigments according to the invention, it is possible to produce printing inks which give rise to print images having a silver or golden interference colour, high metallic lustre and good electrical conductivity. The electrical conductivity alone can serve as invisible security feature here. However, the pigments according to the invention are particularly suitable for the production of print images which can be printed partly with the pigments according to the invention, partly with electrically non-conductive pigments or pigment mixtures having the same colour. Such print images give rise to a uniform colour impression, but are electrically conductive in some areas and electrically non-conductive in other areas, which can be utilised as hidden security feature which can be read out via the electrical properties or via thermal images.

Security products are, for example, bank notes, cheques, credit cards, shares, passports, identity documents, driving licences, entry tickets, revenue stamps, tax stamps, etc., to mention but a few. These may be provided, for example, with bar codes, 2D data matrix codes, alphanumeric symbols or logos which contain the electrically conductive interference pigments having a metallic appearance in accordance with the present invention.

On use of the pigments in paints and coatings, all areas of application known to the person skilled in the art are possible, such as, for example, powder coatings, automobile paints, printing inks for gravure, offset, screen, or flexographic printing and paints in outdoor applications. For the preparation of printing inks, a multiplicity of binders, in particular water-soluble, but also solvent-containing types, for example based on acrylates, methacrylates, polyesters, polyurethanes, nitrocellulose, ethylcellulose, polyamide, polyvinyl butyrate, phenolic resins, melamine resins, maleic resins, starch or polyvinyl alcohol, is suitable. The paints can be water- or solvent-based paints, where the choice of the paint constituents is subject to the general knowledge of the person skilled in the art.

The pigments according to the invention can likewise advantageously be employed for the production of electrically conductive plastics and films, more precisely for all applications known to the person skilled in the art which require electrical conductivity. Suitable plastics here are all standard plastics, for example thermosets and thermoplastics. The pigments according to the invention are subject to the same conditions here as conventional pearlescent or interference pigments. Special features of the introduction into plastics are therefore described, for example, in R. Glausch, M. Kieser, R. Maisch, G. Pfaff, J. Weitzel, Pearlescent pigments, Curt Vincentz Verlag, 1996, 83 ff.

The pigments according to the invention are also suitable for the preparation of flowable pigment preparations and dry preparations which comprise one or more pigments according to the invention, optionally further pigments or colorants, binders and optionally one or more additives. Dry preparations are also taken to mean preparations which comprise 0 to 8% by weight, preferably 2 to 8% by weight, in particular 3 to 6% by weight, of water and/or of a solvent or solvent mixture. The dry preparations are preferably in the form of pearlets, pellets, granules, chips, sausages or briquettes and have particle sizes of about 0.2 to 80 mm.

Due to their electrically conductive and colour properties with a metallic appearance, the interference pigments according to the invention can particularly advantageously be employed, for example, in decorative surfaces with an antistatic finish. Besides the electrical properties, which can be controlled well by the preparation process, the interference pigments according to the invention have a very good hiding power, high lustre and a metallic appearance, so that they are ideal for use for the colouring of otherwise transparent, dielectric layers in the areas of application described above and do not have to be mixed with absorbent colorants or other effect pigments in order also to provide the application medium with an attractive metallic outer appearance, besides the conductive properties.

The interference pigments according to the invention are also particularly suitable for laser marking. When they are added to surface coatings, prints or plastic articles, the outermost, crystalline carbon-containing layer on the pigments can be fully or partly removed or converted into $CO_2$ by laser bombardment, giving optically attractive laser markings in the application medium.

The concentration of the interference pigments according to the invention in the respective application medium is dependent on the properties with respect to colouring and electrical conductivity desired therein and can in each case be selected by the person skilled in the art on the basis of conventional recipes.

Although the interference pigments according to the invention have attractive optical and electrically conductive properties and can thus be employed as the sole effect pigments in a very wide variety of applications, it is of course possible and also advantageous, depending on the application, to mix them if necessary with organic and/or inorganic colorants (in particular with white or coloured pigments) and/or other, electrically conductive materials and/or other, electrically non-conductive effect pigments or to employ them together therewith in an application, for example a coating.

In addition, they can also be mixed with one another in various colours or with differently set electrical conductivity if advantages for the application arise therefrom.

The mixing ratios in the case of all mixtures described above are unlimited so long as the advantageous properties of the pigments according to the invention are not adversely affected by the admixed foreign pigments. The pigments according to the invention can be mixed in any ratio with additives, fillers and/or binder systems which are usual for the application.

The pigments according to the invention have attractive silver or golden interference colours of high intensity and a particularly high hiding power and have very good electrically conductive properties. Besides conventional applications of conductive pigments, they are therefore particularly suitable for the production of security features in security applications and for laser marking.

EXAMPLES

Example 1

Figure 1:
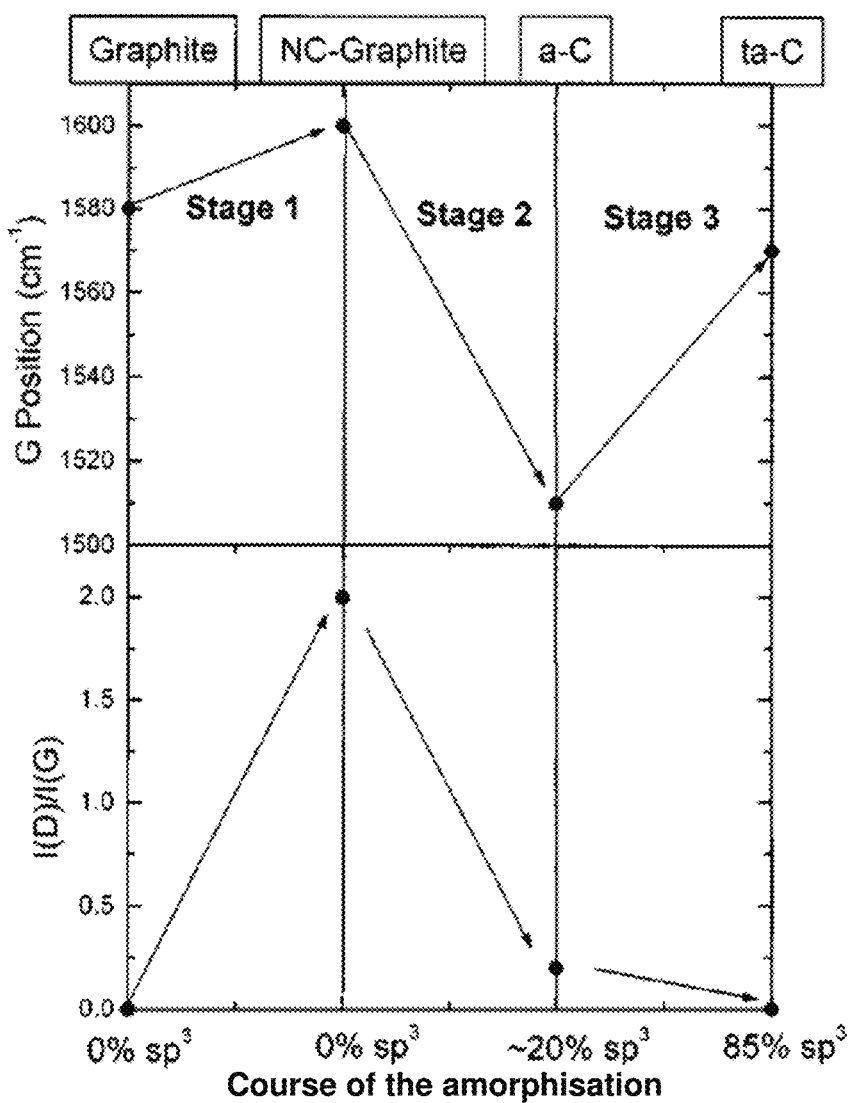
FIG. 1: shows a diagram for the characterisation of carbon with the aid of Raman spectroscopy by the method of A. C. Ferrari and J. Robertson, University of Cambridge

In all inventive examples, a fluidised-bed apparatus which comprises a vertical, cylindrical reaction space which is fitted with a distributor plate at the lower end and with a filter system for retaining the pigments at the upper end, is used as reactor. The fluidised-bed apparatus can be heated and is provided with a vibration device. The pigments are fluidised by the flow of a carrier gas against the pigment bed and, if necessary, additionally by the use of the vibration device. The reaction temperature is in each case in the range from 500° C. to 700° C. The volatile carbon-containing compound (carbon precursor) is fed to the reactor in a mixture with the carrier gas. The reaction time is between 30 and 120 minutes.

500 g of an interference pigment having a silver interference colour (Iriodin® 111 Rutile Fine Satin, particle size 1-15 µm, $d_{90}$ 10.5 µm, $d_{50}$ 6 µm, volume weighted, $TiO_2$ on mica, Merck KGaA, Germany) are initially introduced in the fluidised-bed apparatus. The carrier gas nitrogen is passed through a gas wash bottle containing acetone and thus saturated with acetone. The gaseous nitrogen/acetone mixture is passed into the fluidised-bed apparatus, and the pigments are fluidised by the stream of carrier gas and, if necessary, by switching on the vibration device. When the reaction temperature in the range from 500° C. to 700° C. has been reached, the pigments obtained are removed in several batches after reaction times of 30, 60, 90 and 120 minutes and investigated for their carbon content, the specific powder resistance and the ΔL value. The result is shown in Table 1:

TABLE 1

| T (reaction time) [min] | spec. powder resistance [ohm * cm] | C content by weight [%] | ΔL value |
| --- | --- | --- | --- |
| 0 | >10⁹ | 0.0 | 22.5 |
| 30 | 9 × 10⁵ | 0.5 | 4.6 |
| 60 | 358.3 | 0.9 | 3.3 |
| 90 | 321.5 | 1.2 | 2.6 |
| 120 | 30.0 | 2.2 | 1.0 |

The pigments obtained exhibit a silver interference colour, high metallic lustre and a strongly increasing hiding power with increasing carbon content. Even at a carbon content of only 0.5% by weight, silver-coloured interference pigments having high hiding power and good electrical conductivity are obtained.

Example 2

500 g of the interference pigment from Example 1 (Iriodin® 111 Rutile Fine Satin) are initially introduced in the fluidised-bed apparatus. The carrier gas nitrogen is passed through a gas wash bottle containing acetone or 2-methyl-3-butyn-2-ol which is heated to a temperature in the range from 30 to 90° C. and thus in each case enriched with the latter. The gaseous nitrogen/acetone or nitrogen/2-methyl-3-butyn-2-ol mixture is passed into the fluidised-bed apparatus, and the pigments are fluidised by the stream of carrier gas and, if necessary, by switching on the vibration device. The reaction temperature is set to 500° C. to 700° C. Pigment samples are taken before commencement of the reaction and after 120 minutes or after 40 minutes and investigated for their carbon content, the specific powder resistance and the ΔL value. The result is shown in Table 2.

TABLE 2

| T (reaction time) [min] | C compound | spec. powder resist [ohm * cm] | C content by weight [%] | ΔL value |
| --- | --- | --- | --- | --- |
| 0 | | >10⁹ | 0.0 | 22.5 |
| 120 | Acetone | 30 | 2.2 | 1.0 |
| 40 | 2Methyl3butynol | 604 | 3.0 | 1.8 |

As can be seen from Table 2, silver-coloured interference pigments having a metallic lustre, high hiding power and good electrical conductivity are obtainable by pyrolytic decomposition of various carbon-containing compounds in the process according to the invention.

The pigments obtained in Examples 1 and 2 are characterised by analysis of the carbon contents, measurement of the colouristic properties on paint test charts, SEM photographs, thermal differential analysis, Raman spectroscopy and measurements of the electrical resistance. The evaluation of the carbon content gives values between 0.5 and 3% by weight, based on the weight of the pigments. The SEM photographs show continuous carbon layers having a thickness of 1-3 nm, which corresponds to about 3-9 graphite layers, on the surface of the pigments. The Raman spectra show the presence of essentially graphitic carbon. In addition, the specific powder resistances of the pigments and the colouristic values are determined from black/white paint test charts. The lightness contrast ΔL is calculated from the L values of the black/white paint test charts. It is found that the lightness contrast ΔL correlates with the carbon content of the pigments.

Example 3

In each case, 1 kg of a silver interference pigment (A: Iriodin® 119 Polar White, particle size 5-25 µm, $d_{90}$ 19 µm, $d_{50}$ 10 µm, volume-weighted, $TiO_2$ on mica, and B: Xirallic® T61-10 WNT Micro Silver, particle size≤20 µm, $TiO_2$ on aluminium dioxide, are coated with a crystalline carbon-containing layer by the process described in Example 1 at reaction times of 120 minutes in each case. The results are shown in Table 3.

TABLE 3

| T (reaction time) [min] | spec. powder resistance [ohm * cm] | C content by weight [%] | ΔL value |
|---|---|---|---|
| A | | | |
| 0 | >10$^9$ | 0.0 | 36.6 |
| 120 | 61.3 | 1.4 | 2.4 |
| B | | | |
| 0 | >10$^9$ | 0.0 | 30.4 |
| 120 | 29.9 | 1.2 | 5.7 |

In each case, silver-coloured pigments are obtained which have a high metallic lustre, a high hiding power and high electrical conductivity.

Example 4

Use Example Surface Coating

A pigment prepared in accordance with Example 1 (Iriodin® 111 Rutile Fine Satin having a carbon content of 2.2% by weight) is dispersed in various parts by weight in NC lacquer (12% of collodium/butyl acrylate in a solvent mixture). PET films are coated with the respective coating preparation. The pigment weight concentration (PWC) of the pigments in the dry coating layer varies between 8 and 60%, the layer thickness of the coating layer is in each case 40 μm. The coating layers obtained are in each case opaque and exhibit an attractive metallic-silver colour.

Figure 2:
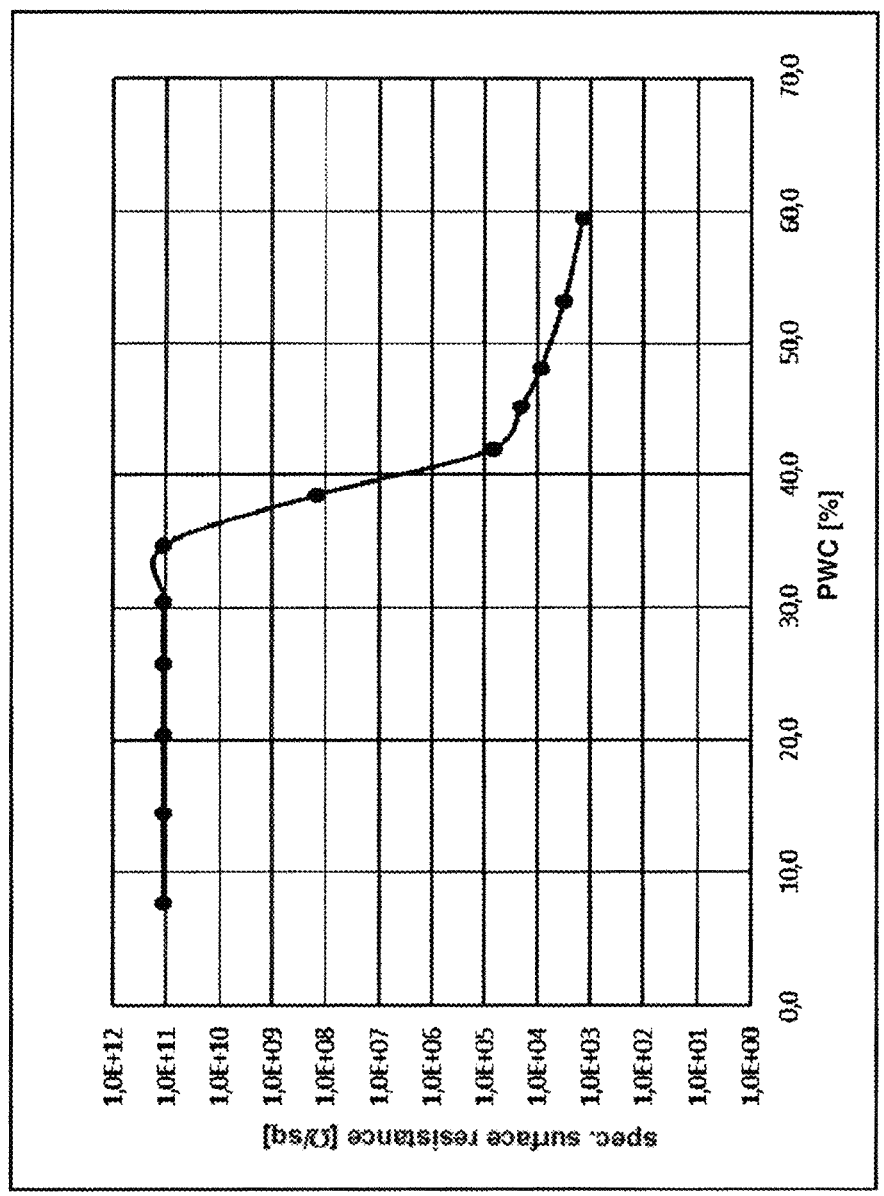
FIG. 2: shows the percolation curve for coating layers comprising a pigment in accordance with Example 1

After drying of the coating layers, the respective surface resistance of the coating layer is measured with the aid of a spring tongue electrode (electrode separation 1 cm, length 10 cm) at a field strength of 100 V/cm, and specific surface resistances, based on a square area, are calculated. In this way, the percolation curve for the pigment is drawn up. The results are shown in FIG. 2. The specific surface resistance of 1.4 Kohm obtained at a pigment weight concentration (PWC) of 60% represents an extraordinarily low value which is comparable with the electrical conductivity of graphite particles. Even the electrical resistances obtained at a PCW of 38% are sufficient for the antistatic finishing of coatings in practice. The pigments according to the invention are thus eminently suitable for use in antistatic and dissipative coatings.

Example 5

Use Example Surface Coating

Example 4 is repeated with the modification that, instead of the pigment according to Example 1, a pigment according to Example 3B (Xirallic® T61-10 WNT Micro Silver having a carbon content of 1.2% by weight) is employed.

Figure 3:
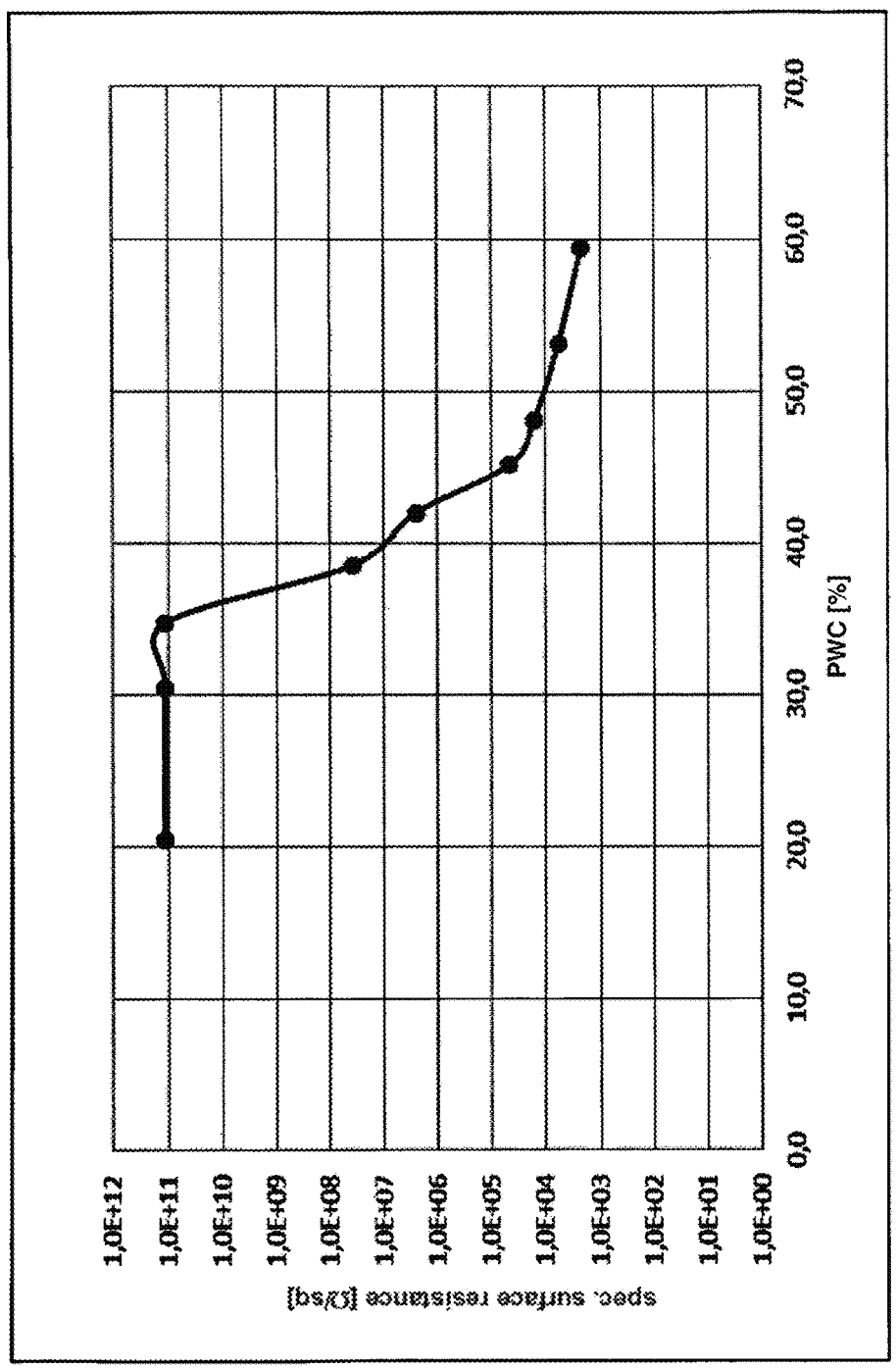
FIG. 3: shows the percolation curve for coating layers comprising a pigment in accordance with Example 3B The present invention is intended to be explained below with reference to examples, but not restricted thereto.

The percolation curve obtained is shown in FIG. 3. The specific surface resistance of 2.2 Kohm obtained at a pigment weight concentration of 60% is likewise comparable with the specific surface resistance of coating layers which can be achieved with graphite particles and represents an excellent value. The coating layers obtained each have a silver-coloured metal lustre and have a high hiding power.

Example 6

Use Example Printing Ink

For the preparation of various printing inks, pigments from various examples described above are in each case introduced into an unpigmented, solvent-containing printing ink for gravure printing (NC TOP OPV 00, solids content 28%, Siegwerk Druckfarben AG & Co. KGaA). After adjustment of the viscosity using a solvent, the printing inks are printed over the entire surface of coated papers having a white, black and dark-blue base colour by gravure printing using an anilox roll having a line screen of 60 lines/cm. The pigment weight concentration in the dry layer is in each case 62%. The prints are assessed visually for appearance, print quality and hiding power. Criterion for the hiding power is the invisibility of the original paper colour after printing. In addition, the surface resistances of the print layers are determined using the spring tongue electrode and are in all cases at values in the range from 10 to 100 Kohm. The visual results are summarised in Table 4.

TABLE 4

| Pigment from Example | Substrate colour | Visual impression |
|---|---|---|
| Ex. 1, 2.2% of C | blue | very good |
| Ex. 1, 2.2% of C | white | very good |
| Ex. 1, 2.2% of C | black | very good |
| Ex. 3A, 1.4% of C | blue | very good |
| Ex. 3A, 1.4% of C | white | very good |
| Ex. 3A, 1.4% of C | black | very good |
| Ex. 3B, 1.2% of C | blue | very good |
| Ex. 3B, 1.2% of C | white | very good |
| Ex. 3B, 1.2% of C | black | very good |

All pigments according to the invention give rise to print images having a lustrous, silver-coloured appearance with a smooth surface and a print image with a homogeneous appearance. The original paper colour is completely hidden in all cases and the prints exhibit low electrical surface resistances. The examples show that the pigments according to the invention are eminently suitable for the production of silver-coloured, dissipative packaging.

Comparative Example 1

Mixtures of the silver-coloured interference pigment from Example 1 (Iriodin® 111 Rutil Fine Satin) with carbon black (Printex L from Orion Engineered Carbons, Inc.) are prepared in such a way that the mixture in each case has the carbon content shown in Table 5. In each case, the specific powder resistance of the mixtures obtained is measured.

TABLE 5

| spec. powder resistance [ohm * cm] | Carbon black content by weight [%] |
|---|---|
| >10$^9$ | 0.0 |
| >10$^9$ | 0.5 |
| >10$^9$ | 1.0 |
| >10$^9$ | 1.5 |
| >10$^9$ | 2.0 |
| >10$^9$ | 2.5 |

The desired specific powder resistance of less than 1×10$^6$ ohm*cm cannot be achieved with the carbon black/interference pigment mixtures.

Comparative Example 2

A silver-coloured interference pigment (Iriodin® 100 Silver Pearl, particle size 10-60 μm, d$_{90}$ 50 μm, d$_{50}$ 25 μm, TiO$_2$ on mica, Merck KGaA) is coated with carbon as described in Example 1. The reaction time is varied in the range from 30 to 120 minutes. The results are shown in Table 6.

TABLE 6

| T (reaction time) [min] | spec. powder resistance [ohm * cm] | C content by weight [%] | ΔL value |
|---|---|---|---|
| 0 | >10$^9$ | 0.0 | 45.9 |
| 30 | 253690 | 0.5 | 26.4 |
| 60 | 1439.4 | 0.8 | 18.6 |
| 120 | 71 | 1.3 | 11.9 |

The results show that opaque pigments cannot be obtained with pigment particles which are not in the size range according to the invention, not even by increasing the carbon content.

Comparative Example 3

Silver-coloured interference pigments (A: Xirallic® Crystal Silver $d_{90}$ 35 μm, $d_{50}$ 19 μm, TiO$_2$ on aluminium oxide, and B: Ronastar® Noble Sparks, $D_{90}$ 170 μm, products from Merck KGaA) are coated with carbon in accordance with Example 1. Pigments having the properties shown in Table 7 are obtained.

TABLE 7

| T (reaction time) [min] | spec. powder resistance [ohm * cm] | C content by weight [%] | ΔL value |
|---|---|---|---|
| A | | | |
| 0 | >10$^7$ | 0.0 | 45 |
| 120 | 22.9 | 0.9 | 16.9 |
| B | | | |
| 0 | >10$^9$ | 0.0 | 68.5 |
| 120 | 270.7 | 0.6 | 45.8 |

The pigment obtained in accordance with Comparative Example 3A is silver-coloured and semitransparent, i.e. does not have the requisite hiding power in order to be able to simulate a metal-like appearance of a coating. The pigment obtained in Comparative Example 3B is a silver-coloured pigment having a low hiding power and a strong sparkle effect.

The invention claimed is:

1. Non-metallic interference pigments based on a flake-form non-metallic support, wherein the pigments have a particle size having a volume-weighted $d_{90}$ value of <25 μm and a volume-weighted $d_{50}$ value of <15 μm, the support has a coating comprising one or more successive layers of a colourless material having a refractive index n of n≥1.8 with a geometrical overall layer thickness of at most 70 nm, wherein the pigments have an outermost layer which consists of at least 95% by weight, based on the weight of this layer, of carbon and comprises crystalline carbon in the form of graphite and/or graphene, wherein the outermost, crystalline carbon-containing layer has a geometrical thickness in the range of from 1-3 nm and the proportion of the outermost crystalline carbon-containing layer, based on the weight of the interference pigment, is 1 to 3% by weight, and wherein the pigments have a specific powder resistance of less than 1×10$^6$ ohm*cm.

2. Interference pigments of claim 1, wherein the pigments have a volume-weighted $d_{50}$ value of less than 10 μm.

3. Interference pigments of claim 1, characterised in that the outermost, crystalline carbon-containing layer consists of at least 98% by weight of carbon.

4. Interference pigments of claim 1, wherein the flake-form support is natural or synthetic mica flakes, kaolin, sericite or talc flakes, BiOCl flakes, TiO$_2$ flakes, glass flakes, borosilicate flakes, SiO$_2$ flakes, Al$_2$O$_3$ flakes, boron nitride flakes, or mixtures of two or more thereof.

5. Interference pigments of claim 1, wherein the layer or layers of a colourless material having a refractive index n in the range n ≥1.8 is/are arranged between the support and the crystalline carbon-containing outermost layer and the pigments have no further layers.

6. Interference pigments of claim 1, wherein the colourless material having a refractive index n in the range n≥1.8 is selected from the group consisting of titanium dioxide, titanium dioxide hydrate, zirconium dioxide, zirconium dioxide hydrate, tin oxide, tin oxide hydrate, zinc oxide, zinc oxide hydrate and/or mixed phases thereof.

7. Interference pigments of claim 6, wherein the layer comprising materials having a refractive index n in the range n≥1.8 consists of titanium dioxide and/or titanium dioxide hydrate.

8. Interference pigments of claim 1, wherein the specific powder resistance is less than 100 ohm*cm.

9. A process for the preparation of non-metallic interference pigments of claim 1, in which flake-form support particles which have been coated with one or more successive layers of a colourless material having a refractive index n of n≥1.8 with a geometrical overall layer thickness of at most 70 nm and have a particle size having a volume-weighted $d_{90}$ value of <25 μm and a volume-weighted $d_{50}$ value of <15 μm are coated with an outermost layer which consists of at least 95% by weight, based on the weight of this layer, of carbon and comprises crystalline carbon in the form of graphite and/or graphene, the crystalline carbon-containing layer having a geometrical thickness in the range of from 1-3 nm and exhibiting a proportion, based on the weight of the interference pigment, of 1 to 3% by weight, in a reactor in a stream of carrier gas with feed of a gaseous, carbon-containing compound by pyrolytic decomposition of the carbon-containing compound at a temperature in the range of from 500° C. to 700° C.

10. The process of claim 9, wherein the gaseous, carbon-containing compound employed is acetone or 2-methyl-3-butyn-2-ol.

11. The process of claim 9, wherein the flake-form support particles are kept in motion in the reactor.

12. A paint, coating, printing ink, coating composition, security application, plastic, ceramic material, glass, paper, film, heat protection composition, floorcovering, laser marking composition, dry preparation or pigment preparation comprising a non-metallic interference pigment of claim 1.

* * * * *